United States Patent
Wang

(10) Patent No.: US 12,081,483 B2
(45) Date of Patent: Sep. 3, 2024

(54) INFORMATION SENDING METHOD, USER TERMINAL AND COMPUTER-READABLE STORAGE MEDIUM

(71) Applicant: BEIJING UNISOC COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 498 days.

(21) Appl. No.: 17/292,356

(22) PCT Filed: Oct. 17, 2019

(86) PCT No.: PCT/CN2019/111609
§ 371 (c)(1),
(2) Date: May 7, 2021

(87) PCT Pub. No.: WO2020/093848
PCT Pub. Date: May 14, 2020

(65) Prior Publication Data
US 2022/0006590 A1     Jan. 6, 2022

(30) Foreign Application Priority Data
Nov. 9, 2018 (CN) .......................... 201811330904.5

(51) Int. Cl.
*H04L 5/00* (2006.01)
*H04L 1/1812* (2023.01)

(52) U.S. Cl.
CPC .......... *H04L 5/0053* (2013.01); *H04L 1/1812* (2013.01)

(58) Field of Classification Search
CPC ... H04L 5/0053; H04L 1/1812; H04L 1/1671; H04L 1/1607; H04W 52/281;
(Continued)

(56) References Cited

U.S. PATENT DOCUMENTS

| 2012/0314613 A1 | 12/2012 | Zhang et al. |
| 2012/0327785 A1 | 12/2012 | Zhang et al. |

(Continued)

FOREIGN PATENT DOCUMENTS

| CN | 102013954 A | 4/2011 |
| CN | 102238716 A | 11/2011 |

(Continued)

OTHER PUBLICATIONS

CATT. "Remaining details of UCI multiplexing on PUSCH" 3GPP TSG RAN WG1 Meeting #92 R1-1801733, Mar. 2, 2018 (Mar. 2, 2018), 2.4 (5 Pages).

(Continued)

*Primary Examiner* — Jung H Park
(74) *Attorney, Agent, or Firm* — Harness, Dickey & Pierce, P.L.C.

(57) ABSTRACT

An information sending method, a user terminal and a computer-readable storage medium. The information sending method comprises: when an instruction for sending target information is detected, determining whether information in the target information has a conflict, wherein the target information comprises N physical channels and M physical signals, and M+N≥2; when the information in the target information has a conflict, acquiring the priority corresponding to the information in the target information; and according to the priority of the information in the target information, processing the target information and then sending same, wherein processing the target information comprises: adjusting the transmitted power of the informa- (Continued)

```
┌─────────────────────────────────────────────────────────────────┐
│ when an instruction for sending a target information is         │  ─── S101
│ detected, determining whether informations in the target        │
│ information have conflict                                       │
└─────────────────────────────────────────────────────────────────┘
                              │
┌─────────────────────────────────────────────────────────────────┐
│ when the informations in the target information have conflict,  │  ─── S102
│ acquiring priorities corresponding to the informations in the   │
│ target information                                              │
└─────────────────────────────────────────────────────────────────┘
                              │
┌─────────────────────────────────────────────────────────────────┐
│ according to the priorities of the informations in the target   │  ─── S103
│ information, processing the target information to get a         │
│ processed target information and then sending the processed     │
│ target information                                              │
└─────────────────────────────────────────────────────────────────┘
``` tion with low priority in the target information; or, discarding some or all of the pieces of information with low priority. The solution can realize the simultaneous sending of two or more uplink physical channels or signals on a single carrier.

18 Claims, 2 Drawing Sheets

(58) Field of Classification Search
CPC ............. H04W 52/346; H04W 52/367; H04W 52/146; H04W 72/21
See application file for complete search history.

(56) References Cited

U.S. PATENT DOCUMENTS

| | | | |
|---|---|---|---|
| 2013/0322376 A1 | 12/2013 | Marinier et al. | |
| 2014/0169300 A1 | 6/2014 | Kim et al. | |
| 2014/0376471 A1* | 12/2014 | Nishio | H04W 52/30 370/329 |
| 2015/0023280 A1 | 1/2015 | Kim et al. | |
| 2015/0036566 A1* | 2/2015 | Blankenship | H04W 72/21 370/311 |
| 2016/0211904 A1 | 7/2016 | Kim et al. | |
| 2016/0315747 A1 | 10/2016 | Kim et al. | |
| 2016/0360541 A1 | 12/2016 | Kim et al. | |
| 2017/0135090 A1 | 5/2017 | Yin et al. | |
| 2017/0180099 A1 | 6/2017 | Kim et al. | |
| 2017/0238323 A1 | 8/2017 | Marinier et al. | |
| 2017/0289832 A1 | 10/2017 | Kim et al. | |
| 2020/0053801 A1* | 2/2020 | Hosseini | H04W 72/21 |
| 2020/0367265 A1* | 11/2020 | Wang | H04W 72/23 |

FOREIGN PATENT DOCUMENTS

| | | |
|---|---|---|
| CN | 102907036 A | 1/2013 |
| CN | 104584450 A | 4/2015 |
| CN | 104604285 A | 5/2015 |
| CN | 105612726 A | 5/2016 |
| CN | 106134120 A | 11/2016 |
| CN | 108023722 A | 5/2018 |
| EP | 3203786 A1 | 8/2017 |
| WO | 2011121063 A1 | 10/2011 |
| WO | WO-2015122630 A1 | 8/2015 |

OTHER PUBLICATIONS

International Search Report (English and Chinese) and Written Opinion (Chinese) of the International Searching Authority issued in PCT/CN2019/111609, mailed Jan. 15, 2020; ISA/CN (8 pages).
Extended European Search Report mailed Jul. 6, 2022, in corresponding European Application No. 19882508.5.
Office Action regarding Chinese Patent Application No. 2018113309045, dated Nov. 1, 2021.
R1-1800382; LG Electronics; Remaining issues on UL data transmission procedure; 3GPP TSG RAN WG1 Meeting AH 1801, Vancouver, Canada, Jan. 22-26, 2018; 13 pages.

* cited by examiner

INFORMATION SENDING METHOD, USER TERMINAL AND COMPUTER-READABLE STORAGE MEDIUM

CROSS-REFERENCE TO RELATED APPLICATIONS

This application is the national phase of International Application No. PCT/CN2019/111609, filed on Oct. 17, 2019, and claims the benefit of priority to Chinese Patent Application No. 201811330904.5, filed on Nov. 9, 2018, and entitled "INFORMATION SENDING METHOD, USER TERMINAL AND COMPUTER-READABLE STORAGE MEDIUM", the entire disclosures of each of the above applications are is incorporated herein by reference.

TECHNICAL FIELD

The present disclosure generally relates to wireless communication technology field, and more particularly, to an information sending method, a user terminal and a computer-readable storage medium.

BACKGROUND

In a single carrier, New Radio (NR) R15 has formulated a priority criterion for handling conflict between multiple uplink physical channels or signals. On each symbol, only one physical channel or signal is supported to be transmitted.

In NR R16, multiple antenna panels of a user terminal are supported to be transmitted at the same time, that is, two or more uplink physical channels or signals are supported to be transmitted at the same time. However, in the existing NR R15 scheme, two or more uplink physical channels or signals are not supported to be transmitted on a single carrier.

SUMMARY

Embodiments of the present disclosure may provide a solution on how to transmit two or more uplink physical channels or signals on a single carrier.

In an embodiment of the present disclosure, an information sending method is provided, including: when an instruction for sending a target information is detected, determining whether informations in the target information have conflict, where the target information includes N physical channels and M physical signals, and (M+N)≥2; when the informations in the target information have conflict, acquiring priorities corresponding to the informations in the target information; and according to the priorities of the informations in the target information, processing the target information to get a processed target information and then sending the processed target information, wherein processing the target information includes: adjusting a transmission power of informations with a lower priority in the target information, or discarding some or all of the informations with the lower priority.

Optionally, determining whether informations in the target information have conflict includes: when the informations in the target information meet a following condition, determining that the informations in the target information have conflict: the informations in the target information overlap on at least one symbol, and a sum power of the informations in the target information is greater than a maximum transmission power of a user terminal; or the informations in the target information overlap on at least one symbol, and a sum rank of the informations in the target information is greater than a maximum number of transmission layers supported by the user terminal; or the informations in the target information overlap on at least one symbol, the sum rank of the informations in the target information is greater than the maximum number of transmission layers supported by the user terminal, and the sum power of the informations in the target information is greater than the maximum transmission power of the user terminal.

Optionally, acquiring priorities corresponding to the informations in the target information includes: acquiring characteristics corresponding to the informations in the target information, wherein characteristics corresponding to each informations include at least one of: a content type corresponding to the information, a time domain type corresponding to the information, a transmission type corresponding to the information and a number of ports corresponding to the information; and according to the characteristics corresponding to the informations in the target information, acquiring the priorities corresponding to the informations in the target information.

Optionally, the informations in the target information include a Physical Uplink Shared Channel (PUSCH) and a Physical Uplink Control Channel (PUCCH), and according to the characteristics corresponding to the informations in the target information, acquiring the priorities corresponding to the informations in the target information includes at least one of: determining that a priority of a PUSCH carrying an Uplink Control Information (UCI) which includes a Hybrid Automatic Repeat Request (HARQ) and/or a Scheduling Request (SR) is higher than a priority of a PUCCH; determining that a priority of a PUSCH carrying a UCI which only includes a Chanel State Information (CSI) is lower than a priority of a PUCCH carrying a UCI which includes a HARQ and/or an SR; determining that a priority of a PUSCH carrying a UCI which only includes a CSI is higher than a priority of a PUCCH carrying a UCI which only includes a CSI; and determining that a priority of a PUSCH which does not carry a UCI is lower than a priority of a PUCCH.

Optionally, the informations in the target information include a PUSCH and a Sounding Reference Signal (SRS), and according to the characteristics corresponding to the informations in the target information, acquiring the priorities corresponding to the informations in the target information includes at least one of: determining that a priority of a PUSCH carrying a UCI which includes a Hybrid Automatic Repeat Request-Acknowledgement (HARQ-ACK) and/or an SR is higher than a priority of the SRS; determining that a priority of a PUSCH carrying a UCI which only includes an aperiodic CSI or a RSRP report is higher than the priority of the SRS; determining that a priority of a PUSCH carrying a UCI which only includes a periodic CSI or a RSRP report is lower than a priority of an aperiodic SRS; determining that a priority of a PUSCH carrying a UCI which only includes a semi-periodic CSI or a RSRP reports is lower than a priority of an aperiodic SRS; determining that a priority of a PUSCH carrying a UCI which only includes a CSI or an RSRP report is higher than a priority of a periodic SRS and a priority of a semi-periodic SRS; and determining a priority of a PUSCH which does not carry a UCI is lower than the priority of the SRS.

Optionally, when a priority of a PUSCH is higher than a priority of an SRS, processing the target information according to the priorities of the informations in the target information includes: discarding SRSs on symbols overlapping in the time domain; or reducing transmission powers of the SRSs on the symbols overlapping in the time domain.

Optionally, when a priority of a PUSCH is higher than a priority of an SRS, processing the target information according to the priorities of the informations in the target information includes: discarding SRS ports corresponding to SRS resources on the symbols overlapping in the time domain; or reducing transmission powers of SRS ports corresponding to SRS resources on the symbols overlapping in the time domain.

Optionally, the informations in the target information include multiple different PUSCHs, and according to the characteristics corresponding to the informations in the target information, acquiring the priorities corresponding to the informations in the target information includes at least one of: determining that a priority of a PUSCH carrying a UCI which includes a HARQ and/or an SR and a CSI is higher than a priority of a PUSCH carrying a UCI which only includes a HARQ and/or an SR; determining that a priority of a PUSCH carrying a UCI which includes a HARQ and/or an SR is higher than a priority of a PUSCH carrying a UCI which only includes a CSI; determining that a priority of a PUSCH carrying a UCI which only includes a CSI is higher than a priority of a PUSCH which does not carry a UCI; determining that a priority of a PUSCH with a low rank and not carrying a UCI is higher than a priority of a PUSCH with a high rank and not carrying a UCI; determining that a priority of a PUSCH with a low rank and not carrying a UCI is higher than a priority of a PUSCH with a high rank and not carrying a UCI; when a first PUSCH and a second PUSCH have a same rank and do not carry a UCI, or when UCIs carried by the first PUSCH and the second PUSCH have a same content type and the first PUSCH and the second PUSCH have a same rank, determining priorities of the first PUSCH and the second PUSCH to be inversely related to Modulation and Coding Scheme (MCS) values thereof; or determining that a priority of a configured grant PUSCH is higher than a priority of a scheduled PUSCH.

Optionally, when the informations in the target information include multiple different SRSs, acquiring the priorities corresponding to the informations in the target information according to the characteristics corresponding to the informations in the target information includes: when two SRSs are detected to have a same time domain behavior, determining that priorities of the two SRSs are inversely related to numbers of ports corresponding to the two SRSs.

In an embodiment of the present disclosure, a user terminal is provided, including: a determining unit, adapted to, when an instruction for sending a target information is detected, determine whether informations in the target information conflict, where the target information includes N physical channels and M physical signals, and (M+N)≥2; an acquiring unit, adapted to acquire priorities corresponding to the informations in the target information, when the informations in the target information conflict; a processing unit, adapted to, according to the priorities of the informations in the target information, process the target information to get a processed target information, wherein processing the target information includes: adjusting transmission powers of informations with a lower priority in the target information, or discarding some or all of the informations with the lower priority; and a sending unit, adapted to send the processed target information.

Optionally, the determining unit is adapted to, when the informations in the target information meet a following condition, determine that the informations in the target information have conflict: the informations in the target information overlap on at least one symbol, and a sum power of the informations in the target information is greater than a maximum transmission power of the user terminal; or the informations in the target information overlap on at least one symbol, and a sum rank of the informations in the target information is greater than a maximum number of transmission layers supported by the user terminal; or the informations in the target information overlap on at least one symbol, the sum rank of the informations in the target information is greater than the maximum number of transmission layers supported by the user terminal, and the sum power of the informations in the target information is greater than the maximum transmission power of the user terminal.

Optionally, the acquiring unit is adapted to acquire characteristics corresponding to the informations in the target information, where characteristics corresponding to each informations includes at least one of: a content type corresponding to the information, a time domain type corresponding to the information, a transmission type corresponding to the information and a number of ports corresponding to the information; and according to the characteristics corresponding to the informations in the target information, acquiring the priorities corresponding to the informations in the target information.

Optionally, when the informations in the target information include a PUSCH and a PUCCH, the acquiring unit is adapted to acquire the priorities of the informations in the target information in at least one of: determining that a priority of a PUSCH carrying a UCI which includes a HARQ and/or a SR is higher than a priority of a PUCCH; determining that a priority of a PUSCH carrying a UCI which only includes a CSI is lower than a priority of a PUCCH carrying a UCI which includes a HARQ and/or an SR; determining that a priority of a PUSCH carrying a UCI which only includes a CSI is higher than a priority of a PUCCH carrying a UCI which only includes a CSI; and determining that a priority of a PUSCH which does not carry a UCI is lower than a priority of a PUCCH.

Optionally, when the informations in the target information include a PUSCH and a SRS, the acquiring unit is adapted to acquire the priorities of the informations in the target information in at least one of: determining that a priority of a PUSCH carrying a UCI which includes a HARQ-ACK and/or an SR is higher than a priority of the SRS; determining that a priority of a PUSCH carrying a UCI which only includes an aperiodic CSI or a RSRP report is higher than the priority of the SRS; determining that a priority of a PUSCH carrying a UCI which only includes a periodic CSI or a RSRP report is lower than a priority of an aperiodic SRS; determining that a priority of a PUSCH carrying a UCI which only includes a semi-periodic CSI or a RSRP reports is lower than a priority of an aperiodic SRS; determining that a priority of a PUSCH carrying a UCI which only includes a CSI or an RSRP report is higher than a priority of a periodic SRS and a priority of a semi-periodic SRS; and determining a priority of a PUSCH which does not carry a UCI is lower than the priority of the SRS.

Optionally, when a priority of a PUSCH is higher than a priority of an SRS, the processing unit is adapted to discard SRSs on symbols overlapping in the time domain or reduce transmission powers of the SRSs on the symbols overlapping in the time domain.

Optionally, when a priority of a PUSCH is higher than a priority of an SRS, the processing unit is adapted to discard SRS ports corresponding to SRS resources on the symbols overlapping in the time domain or reduce transmission powers of SRS ports corresponding to SRS resources on the symbols overlapping in the time domain.

Optionally, when the informations in the target information include multiple different PUSCHs, the acquiring unit is adapted to acquire the priorities of the informations in the target information in at least one of: determining that a priority of a PUSCH carrying a UCI which includes a HARQ and/or an SR and a CSI is higher than a priority of a PUSCH carrying a UCI which only includes a HARQ and/or an SR; determining that a priority of a PUSCH carrying a UCI which includes a HARQ and/or an SR is higher than a priority of a PUSCH carrying a UCI which only includes a CSI; determining that a priority of a PUSCH carrying a UCI which only includes a CSI is higher than a priority of a PUSCH which does not carry a UCI; determining that a priority of a PUSCH with a low rank and not carrying a UCI is higher than a priority of a PUSCH with a high rank and not carrying a UCI; determining that a priority of a PUSCH with a low rank and not carrying a UCI is higher than a priority of a PUSCH with a high rank and not carrying a UCI; when a first PUSCH and a second PUSCH have a same rank and do not carry a UCI, or when UCIs carried by the first PUSCH and the second PUSCH have a same content type and the first PUSCH and the second PUSCH have a same rank, determining priorities of the first PUSCH and the second PUSCH to be inversely related to MCS values thereof; or determining that a priority of a configured grant PUSCH is higher than a priority of a scheduled PUSCH.

Optionally, when the informations in the target information include multiple different SRSs, the acquiring unit is adapted to, when two SRSs are detected to have a same time domain behavior, determine that priorities of the two SRSs are inversely related to numbers of ports corresponding to the two SRSs.

In an embodiment of the present disclosure, a computer readable storage medium having computer instructions stored therein is provided, wherein the computer readable storage medium is a non-volatile storage medium or a non-transitory storage medium, and once the computer instructions are executed, the above information sending method is performed.

In an embodiment of the present disclosure, a user terminal having a memory and a processor is provided, wherein the memory has computer instructions stored therein, and when the processor executes the computer instructions, the above information sending method is performed.

Embodiments of the present disclosure may provide following advantages.

In embodiments of the present disclosure, when N physical channels and M physical signals are transmitted simultaneously and informations in a target information are determined to have conflict, priorities corresponding to the informations in the target information are acquired. According to the priorities of the informations in the target information, the target information is processed to get a processed target information, in which transmission powers of informations with a lower priority are adjusted, or the transmission of the informations with the lower priority are cancelled, so that the informations in the processed target information have no conflict, and the multiple informations can be transmitted at the same time on a single carrier.

DETAILED DESCRIPTION

As described in background, in the prior art, two or more uplink physical channels or signals are not supported to be transmitted at the same time.

In embodiments of the present disclosure, when N physical channels and M physical signals are transmitted simultaneously and informations in a target information are determined to have conflict, priorities corresponding to the informations in the target information are acquired. According to the priorities of the informations in the target information, the target information is processed to get a processed target information, in which transmission powers of informations with a lower priority are adjusted, or the transmission of the informations with the lower priority are cancelled, so that the informations in the processed target information have no conflict, and the multiple informations can be transmitted at the same time.

In order to clarify the object, characteristic and advantages of embodiments of the present disclosure, embodiments of present disclosure will be described clearly in detail in conjunction with accompanying drawings.

Figure 1:
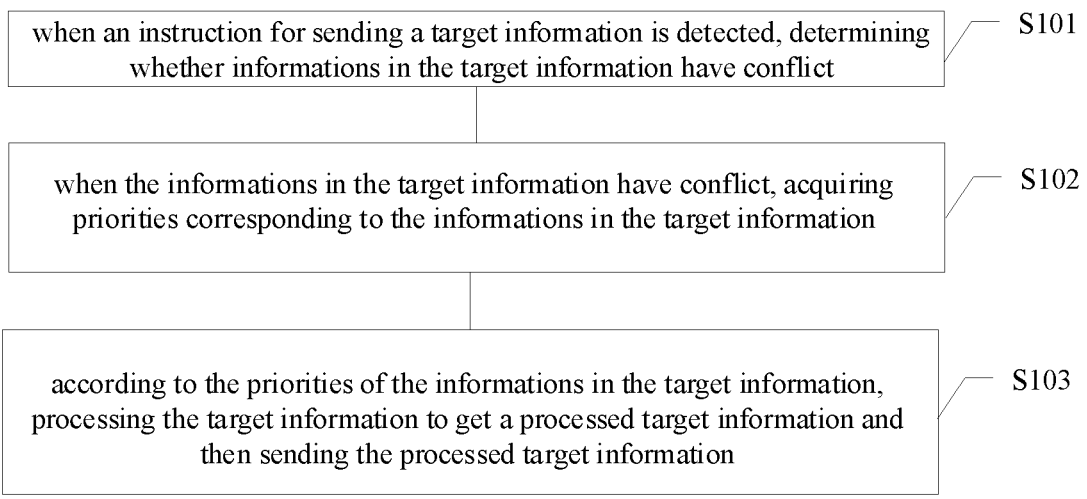
FIG. 1 schematically illustrate a flow chart of an information sending method according to an embodiment.

Referring to FIG. 1, in an embodiment of the present disclosure, an information sending method is provided.

In S101, when an instruction for sending a target information is detected, whether informations in the target information have conflict is determined.

In some embodiments, a base station may send an instruction information to a user terminal to instruct the user terminal to send a target information. The base station may instruct the user terminal to send the target information implicitly or explicitly. In practical applications, the base station may instruct the user terminal to send the target information through a Downlink Control Information (DCI).

After receiving the instruction information sent by the base station, the user terminal can learn that there is a need to send the target information to the base station.

In some embodiments, the target information may include N physical channels and M physical signals, where N and M are both integers which are not less than 0, and (M+N)≥2. In other words, when the target information only carries physical channels, a total number of the physical channels is greater than or equal to 2; when the target information only carries physical signals, a total number of the physical signals is greater than or equal to 2; and when the target information carries physical channels and physical signals, a number of physical channels is greater than or equal to 1 and a number of physical signals is greater than or equal to 1.

In some embodiments, when the user terminal detects the instruction for sending the target information and the target information needs to be sent at the same time, the informations in the target information may have conflict. Therefore, in the embodiments of the present disclosure, whether the informations in the target information have conflict is determined first; and when it is determined that the informations in the target information have conflict, S102 may be executed.

In some embodiments, when the user terminal detects that the informations in the target information overlap on at least one symbol, and a sum power of the informations in the target information is greater than a maximum transmission power of the user terminal, the informations in the target information may be determined to have conflict. When the user terminal detects that the informations in the target information overlap on at least one symbol, and a sum rank of the informations in the target information is greater than a maximum number of transmission layers supported by the user terminal, the informations in the target information may be determined to have conflict.

When the user terminal detects that the informations in the target information overlap on at least one symbol, the sum power of the informations in the target information is greater than the maximum transmission power of the user terminal, and the sum rank of the informations in the target information is greater than the maximum number of transmission layers supported by the user terminal, the informations in the target information may also be determined to have conflict.

In S102, when the informations in the target information are determined to have conflict, priorities corresponding to the informations in the target information are acquired.

In some embodiments, when the informations in the target information are determined to have conflict, the priorities corresponding to the informations in the target information are acquired.

In some embodiments, the priorities corresponding to the informations in the target information are related to characteristics corresponding to the informations. Characteristics corresponding to each information may include at least one of: a content type corresponding to the information, a time domain type corresponding to the information, a transmission type corresponding to the information and a number of ports corresponding to the information. After obtaining the characteristics corresponding to the informations in the target information, the priorities corresponding to the informations in the target information can be acquired.

In some embodiments, when an information in the target information is a Physical Uplink Shared Channel (PUSCH) or a Physical Uplink Control Channel (PUCCH), a corresponding content type may be whether an Uplink Control Information (UCI) is included. For example, the information in the target information is the PUSCH, and the content type corresponding to the PUSCH is: the PUSCH includes the UCI.

In some embodiments, when an information in the target information is a PUSCH or a PUCCH, a corresponding content type may also be a content included in a UCI. For example, the information in the target information is the PUSCH, and the content type corresponding to the PUSCH is: the UCI includes a Hybrid Automatic Repeat Request (HARD) and/or a Scheduling Request (SR).

In some embodiments, when an information in the target information is a PUSCH, a corresponding time domain type may be a periodicity of a Channel State Information (CSI) or a Reference signal received power (RSRP) report included in the UCI. The periodicity of the CSI or the RSRP report may be periodic, aperiodic, semi-periodic, etc.

For example, the UCI carried by the PUSCH includes aperiodic CSI or RSRP report, or the UCI carried by the PUSCH includes periodic CSI or RSRP report.

In some embodiments, when an information in the target information is a Sounding Reference Signal (SRS), a corresponding time domain type may include periodic, aperiodic, semi-periodic, and so on. For example, the SRS is an aperiodic SRS. In another example, the SRS is a periodic SRS.

In some embodiments, a transmission type corresponding to an information in the target information may be one-layer transmission, two-layer transmission or three-layer transmission. In the embodiments of the present invention, a number of layers of the corresponding transmission type is a rank corresponding to the information.

For example, if the transmission type corresponding to a PUSCH is two-layer transmission, the rank corresponding to the PUSCH is 2.

Hereinafter, how to acquire the priorities corresponding to the informations in the target information are described in detail.

In some embodiments, the target information may include a PUSCH and a PUCCH. When the target information includes a PUSCH and a PUCCH, one or more of the following schemes may be used to acquire the priorities of the PUSCH and the PUCCH:

When the PUSCH carries a UCI, and the UCI includes a HARQ and/or a SR, the priority of the PUCSH is higher than the priority of the PUCCH. In this case, regardless of the information carried in the PUCCH, the priority of the PUCCH is lower than the priority of the PUSCH.

When a UCI carried by the PUSCH only includes a CSI, the priority of the PUSCH is lower than the priority of the PUCCH which carries a UCI including a HARQ and/or a SR.

When a UCI carried by the PUSCH only includes a CSI, the priority of the PUSCH is higher than the priority of the PUCCH which carries a UCI only including a CSI.

When the PUSCH does not carry a UCI, the priority of the PUSCH is lower than that of the PUCCH.

In other words, when the content corresponding to the PUSCH is the same as that of the PUCCH, the priority of the PUSCH is higher than the priority of the PUCCH. The priority of the PUCCH with a UCI is higher than the priority of the PUSCH without a UCI.

In some embodiments, the target information may include a PUSCH and an SRS. When the target information includes a PUSCH and an SRS, one or more of the following schemes may be used to acquire the priorities of the PUSCH and the SRS:

When the PUSCH carries a UCI which includes a Hybrid Automatic Repeat Request-Acknowledgement (HARQ-ACK) and/or an SR, the priority of the PUSCH is higher than the priority of any type of SRS.

When the PUSCH carries a UCI which only includes an aperiodic CSI or a RSRP report, the priority of the PUSCH is higher than the priority of any type of SRS.

When the PUSCH carries a UCI which only includes a periodic CSI or a RSRP report, the priority of the PUSCH is lower than the priority of an aperiodic SRS.

When the PUSCH carries a UCI which includes a semi-periodic CSI or a RSRP reports, the priority of the PUSCH is lower than the priority of an aperiodic SRS.

When the PUSCH carries a UCI which only includes a CSI or an RSRP report, the priority of the PUSCH is higher than the priority of a periodic SRS and the priority of a semi-periodic SRS.

When the PUSCH does not carry a UCI, the priority of the PUSCH without the UCI is lower than the priority of an SRS.

In some embodiments, the target information may include multiple different PUSCHs. When the target information includes the multiple different PUSCHs, one or more of the following schemes may be used to acquire the priorities of the multiple different PUSCHs.

When a UCI carried by a first PUSCH includes a HARQ and/or an SR and a CSI, and a UCI carried by a second PUSCH only includes a HARQ and/or an SR, the priority of the first PUSCH is determined to be higher than the priority of the second PUSCH.

When a UCI carried by a first PUSCH includes a HARQ and/or an SR, and a UCI carried by a second PUSCH only includes a CSI, it is determined that the priority of the first PUSCH is higher than the priority of the second PUSCH.

When a UCI carried by a first PUSCH only includes a CSI, and a second PUSCH does not carry a UCI, it is determined that the priority of the first PUSCH is higher than the priority of the second PUSCH.

When a first PUSCH with a low rank does not carry a UCI, and a second PUSCH with a high rank does not carry a UCI, it is determined that the priority of the first PUSCH is higher than the priority of the second PUSCH.

When it is detected that a first PUSCH and a second PUSCH have the same rank and do not carry a UCI, if a Modulation and Coding Scheme (MCS) value corresponding to the first PUSCH is less than a MCS value corresponding to the second PUSCH, the priority of the first PUSCH is determined to be higher than the priority of the second PUSCH, that is, the priorities of the PUSCHs are inversely related to the MCS values thereof.

When it is detected that contents carried by a first PUSCH and a second PUSCH have a same type and the first PUSCH and the second PUSCH have a same rank, if a MCS value corresponding to the first PUSCH is less than a MCS value corresponding to the second PUSCH, the priority of the first PUSCH is determined to be higher than the priority of the second PUSCH, that is, the priorities of the PUSCHs are inversely related to the MCS values thereof.

When it is detected that a first PUSCH and a second PUSCH have the same rank and do not carry a UCI, if the first PUSCH is a configured grant PUSCH and the second PUSCH is a scheduled PUSCH, the priority of the first PUSCH is determined to be higher than the priority of the second PUSCH.

In some embodiments, the target information may include multiple different SRSs. When the target information includes the multiple different SRSs, one or more of the following schemes may be used to acquire the priorities of the multiple different SRSs.

When the user terminal detects that two SRSs have a same time domain behavior, the SRS corresponding to more ports has a lower priority.

For example, if a number of ports corresponding to a first SRS is M, a number of ports corresponding to a second SRS is N, and M>N, it is determined that the priority of the first SRS is lower than the priority of the second SRS.

In S103, according to the priorities of the informations in the target information, the target information is processed and sent.

In some embodiments, according to the priorities of the informations in the target information, the user terminal may process the target information to get a processed target information and send the processed target information to the base station.

In some embodiments, the target information may be processed by adjusting a transmission power of informations with a lower priority in the target information, or discarding some or all of the informations with the lower priority.

In some embodiments, the informations with the lower priority may refer to informations with a priority lower than a highest priority.

In some embodiments, while adjusting the transmission powers of informations with a priority lower than the highest priority in the target information, the transmission powers may be configured for different informations in sequence according to the priorities of the informations in the target information, that is, the transmission powers are configured to be positively related to the priorities of the informations. After the target information is processed, a sum power corresponding to the informations in the processed target information is not greater than a maximum transmission power of the user terminal.

For example, the target information includes a first PUSCH and a second PUSCH, and the priorities of the first PUSCH is higher than that of the second PUSCH. By adjusting the transmission power of the informations in the target information, an adjusted transmission power P1 of the first PUSCH is greater than an adjusted transmission power P2 of the second PUSCH, where (P1+P2)≤Pmax, and Pmax is the maximum transmission power of the user terminal.

In some embodiments, while discarding the informations with a priority lower than the highest priority, informations with a lowest priority may be discarded preferentially according to the priorities of the informations in the target information. After discarding the informations with the lowest priority, if the informations in the target information still have conflict, informations with a second lowest priority in the target information may be discarded, and so on, until the informations in the adjusted target information have no conflict.

In other words, after the target information is processed, the informations in the processed target information do not conflict.

For example, the target information includes a first PUSCH, a second PUSCH and a third PUSCH. The first PUSCH has a highest priority, the second PUSCH has a second priority, and the third PUSCH has a lowest priority. When the target information is processed, the third PUSCH is discarded first. If it is detected that the first PUSCH and the second PUSCH in the target information still conflict after discarding the third PUSCH, the second PUSCH is discarded. In this case, only the first PUSCH is retained in the processed target information.

In some embodiments, if the priority of a PUSCH is higher than the priority of an SRS, when the target information is processed according to the priorities of the informations in the target information, SRSs on symbols overlapping in the time domain may be discarded, or SRS ports corresponding to SRS resources on the symbols overlapping in the time domain may be discarded.

In some embodiments, if the priority of a PUSCH is higher than the priority of an SRS, when the target information is processed according to the priorities of the informations in the target information, transmission powers of SRSs on the symbols overlapping in the time domain may be reduced, transmission powers of SRS ports corresponding to SRS resources on the symbols overlapping in the time domain may be reduced.

Figure 2:
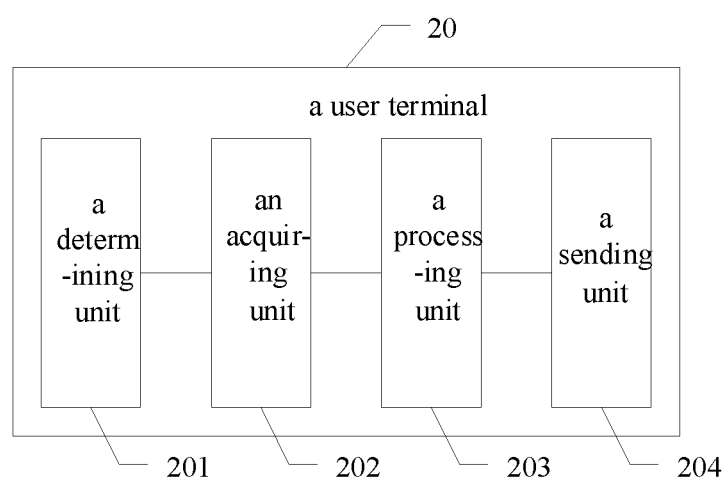
FIG. 2 is a structural diagram of a user terminal according to an embodiment.

Referring to FIG. 2, FIG. 2 is a structural diagram of a user terminal 20 according to an embodiment, where the user terminal 20 includes: a determining unit 201, an acquiring unit 202, a processing unit 203 and a sending unit 204.

Specifically, the determining unit 201 is adapted to, when an instruction for sending a target information is detected, determine whether informations in the target information conflict; where the target information includes N physical channels and M physical signals, and (M+N)≥2.

The acquiring unit 202 is adapted to acquire priorities corresponding to the informations in the target information, when the informations in the target information conflict.

The processing unit 203 is adapted to, according to the priorities of the informations in the target information, process the target information to get a processed target information, wherein processing the target information includes: adjusting transmission powers of informations with a lower priority in the target information, or discarding some or all of the informations with the lower priority.

The sending unit 204 is adapted to send the processed target information.

In some embodiments, the determining unit 201 is adapted to, when the informations in the target information meet a following condition, determine that the informations in the target information have conflict: the informations in the target information overlap on at least one symbol, and a sum power of the informations in the target information is greater than a maximum transmission power of a user terminal; or the informations in the target information overlap on at least one symbol, and a sum rank of the informations in the target information is greater than a maximum number of transmission layers supported by the user terminal; or the informations in the target information overlap on at least one symbol, the sum rank of the informations in the target information is greater than the maximum number of transmission layers supported by the user terminal, and the sum power of the informations in the target information is greater than the maximum transmission power of the user terminal.

In some embodiments, the acquiring unit 202 is adapted to acquire characteristics corresponding to the informations. Characteristics corresponding to each information may include at least one of: a content type corresponding to the information, a time domain type corresponding to the information, a transmission type corresponding to the information and a number of ports corresponding to the information. After obtaining the characteristics corresponding to the informations in the target information, the priorities corresponding to the informations in the target information can be acquired.

In some embodiments, when the informations in the target information include a PUSCH and a PUCCH, the acquiring unit 202 is adapted to acquire the priorities of the informations in the target information in at least one of the following ways: determining that the priority of the PUSCH which carries a UCI including a HARQ and/Or an SR is higher than the priority of the PUCCH; determining that the priority of the PUSCH which carries a UCI including only a CSI is lower than the priority of the PUCCH which carries a UCI including a HARQ and/or an SR; determining that the priority of the PUSCH which carries a UCI including only a CSI is higher than the priority of the PUCCH that carries a UCI including only a CSI; and determining that the priority of the PUSCH that does not carry a UCI is lower than the priority of the PUCCH.

In some embodiments, when the informations in the target information include a PUSCH and an SRS, the acquiring unit 202 is adapted to acquire the priorities of the informations in the target information in at least one of the following ways: determining that the priority of the PUSCH which carries a UCI including a HARQ-ACK and/or an SR is higher than the priority of the SRS; determining that the priority of the PUSCH which carries a UCI only including an aperiodic CSI or a RSRP report is higher than the priority of the SRS; determining that the priority of the PUSCH which carries a UCI only including a periodic CSI or a RSRP report is lower than the priority of an aperiodic SRS; determining that the priority of the PUSCH which carries a UCI including a semi-periodic CSI or a RSRP reports is lower than the priority of an aperiodic SRS; determining that the priority of the PUSCH which carries a UCI only including a CSI or an RSRP report is higher than the priority of a periodic SRS and the priority of a semi-periodic SRS; and determining the priority of the PUSCH that does not carry a UCI is lower than the priority of the SRS.

In some embodiments, the processing unit 203 is adapted to, when the acquiring unit determines that the priority of a PUSCH is higher than the priority of an SRS, discard SRSs on symbols that overlap in the time domain, or reduce transmission power of the SRSs on the symbols that overlap in the time domain.

In some embodiments, the processing unit 203 is adapted to, when the acquiring unit determines that the priority of a PUSCH is higher than the priority of an SRS, discard SRS ports corresponding to SRS resources on the symbols overlapping in the time domain, or reduce transmission powers of SRS ports corresponding to SRS resources on the symbols overlapping in the time domain.

In some embodiments, when the informations in the target information include multiple different PUSCHs, the acquiring unit 202 is adapted to acquire the priorities of the informations in the target information in at least one of the following ways: determining that the priority of a PUSCH carrying a UCI which includes a HARQ and/or an SR and a CSI is higher than the priority of a PUSCH carrying a UCI which only includes a HARQ and/or an SR; determining that the priority of a PUSCH carrying a UCI which includes a HARQ and/or an SR is higher than the priority of a PUSCH carrying a UCI which only includes a CSI; determining that the priority of a PUSCH carrying a UCI which only includes a CSI is higher than the priority of a PUSCH which does not carry a UCI; determining that the priority of a PUSCH with a low rank and not carrying a UCI is higher than the priority of a PUSCH with a high rank and not carrying a UCI; determining that the priority of a PUSCH with a low rank and not carrying a UCI is higher than the priority of a PUSCH with a high rank and not carrying a UCI; when a first PUSCH and a second PUSCH have a same rank and do not carry a UCI, or when UCIs carried by the first PUSCH and the second PUSCH have a same content type and the first PUSCH and the second PUSCH have a same rank, determining priorities of the first PUSCH and the second PUSCH to be inversely related to Modulation and Coding Scheme (MCS) values thereof; or determining that the priority of a configured grant PUSCH is higher than the priority of a scheduled PUSCH.

In some embodiments, when the informations in the target information include a plurality of different SRSs, the acquiring unit 202 is adapted to, when two SRSs are detected to have a same time domain behavior, determine that the priorities of the two SRSs are inversely related to numbers of ports corresponding to the two SRSs.

In an embodiment of the present disclosure, a computer-readable storage medium having computer instructions stored therein is provided, wherein the computer-readable storage medium is a non-volatile storage medium or a non-transitory storage medium, and once the computer instructions are executed, the above information sending method is performed.

In an embodiment of the present disclosure, another user terminal including a memory and a processor is provided, wherein the memory has computer instructions stored therein, and when the processor executes the computer instructions, the above information sending method is performed.

Those skilled in the art can understand that all or part of the steps of the methods provided in the embodiments of the present disclosure can be performed by computer instructions in conjunction with relevant hardware. The computer instructions may be stored in a computer readable storage medium, which includes: a Read Only Memory (ROM), a Random Access Memory (RAM), a magnetic disk, an optical disk or the like.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An information sending method, comprising:
in response to an instruction for sending a target information being detected, determining whether informations in the target information have conflict, where the target information comprises N physical channels and M physical signals, and (M+N)≥2;
in response to the informations in the target information having conflict, acquiring priorities corresponding to the informations in the target information; and
according to the priorities of the informations in the target information, processing the target information to get a processed target information and then sending the processed target information on a single carrier, wherein processing the target information comprises: adjusting a transmission power of informations with a lower priority in the target information, or discarding some or all of the informations with the lower priority;
wherein determining whether informations in the target information have conflict comprises: in response to the informations in the target information meeting a following condition, determining that the informations in the target information have conflict:
the informations in the target information overlap on at least one symbol, and a sum rank of the informations in the target information is greater than a maximum number of transmission layers supported by the user terminal; or
the informations in the target information overlap on at least one symbol, the sum rank of the informations in the target information is greater than the maximum number of transmission layers supported by the user terminal, and the sum power of the informations in the target information is greater than the maximum transmission power of the user terminal.

2. The information sending method according to claim 1, wherein acquiring priorities corresponding to the informations in the target information comprises:
acquiring characteristics corresponding to the informations in the target information, wherein characteristics corresponding to each informations comprises at least one of: a content type corresponding to the information, a time domain type corresponding to the information, a transmission type corresponding to the information and a number of ports corresponding to the information; and
according to the characteristics corresponding to the informations in the target information, acquiring the priorities corresponding to the informations in the target information.

3. The information sending method according to claim 2, wherein in response to the informations in the target information comprising a Physical Uplink Shared Channel (PUSCH) and a Physical Uplink Control Channel (PUCCH), according to the characteristics corresponding to the informations in the target information, acquiring the priorities corresponding to the informations in the target information comprises at least one of:

determining that a priority of a PUSCH carrying an Uplink Control Information (UCI) which comprises a Hybrid Automatic Repeat Request (HARQ) and/or a Scheduling Request (SR) is higher than a priority of a PUCCH;
determining that a priority of a PUSCH carrying a UCI which only comprises a Chanel State Information (CSI) is lower than a priority of a PUCCH carrying a UCI which comprises a HARQ and/or an SR;
determining that a priority of a PUSCH carrying a UCI which only comprises a CSI is higher than a priority of a PUCCH carrying a UCI which only comprises a CSI; and
determining that a priority of a PUSCH which does not carry a UCI is lower than a priority of a PUCCH.

4. The information sending method according to claim 2, wherein the informations in the target information comprise a PUSCH and a Sounding Reference Signal (SRS), and according to the characteristics corresponding to the informations in the target information, acquiring the priorities corresponding to the informations in the target information comprises at least one of:
determining that a priority of a PUSCH carrying a UCI which comprises a Hybrid Automatic Repeat Request-Acknowledgement (HARQ-ACK) and/or an SR is higher than a priority of the SRS;
determining that a priority of a PUSCH carrying a UCI which only comprises an aperiodic CSI or a RSRP report is higher than the priority of the SRS;
determining that a priority of a PUSCH carrying a UCI which only comprises a periodic CSI or a RSRP report is lower than a priority of an aperiodic SRS;
determining that a priority of a PUSCH carrying a UCI which only comprises a semi-periodic CSI or a RSRP reports is lower than a priority of an aperiodic SRS;
determining that a priority of a PUSCH carrying a UCI which only comprises a CSI or an RSRP report is higher than a priority of a periodic SRS and a priority of a semi-periodic SRS; and
determining a priority of a PUSCH which does not carry a UCI is lower than the priority of the SRS.

5. The information sending method according to claim 4, wherein in response to a priority of a PUSCH being higher than a priority of an SRS, processing the target information according to the priorities of the informations in the target information comprises:
discarding SRSs on symbols overlapping in the time domain; or
reducing transmission powers of the SRSs on the symbols overlapping in the time domain.

6. The information sending method according to claim 4, wherein in response to a priority of a PUSCH being higher than a priority of an SRS, processing the target information according to the priorities of the informations in the target information comprises:
discarding SRS ports corresponding to SRS resources on the symbols overlapping in the time domain; or
reducing transmission powers of SRS ports corresponding to SRS resources on the symbols overlapping in the time domain.

7. The information sending method according to claim 2, wherein the informations in the target information comprise multiple different PUSCHs, and according to the characteristics corresponding to the informations in the target information, acquiring the priorities corresponding to the informations in the target information comprises at least one of:

determining that a priority of a PUSCH carrying a UCI which comprises a HARQ and/or an SR and a CSI is higher than a priority of a PUSCH carrying a UCI which only comprises a HARQ and/or an SR;

determining that a priority of a PUSCH carrying a UCI which comprises a HARQ and/or an SR is higher than a priority of a PUSCH carrying a UCI which only comprises a CSI;

determining that a priority of a PUSCH carrying a UCI which only comprises a CSI is higher than a priority of a PUSCH which does not carry a UCI;

determining that a priority of a PUSCH with a low rank and not carrying a UCI is higher than a priority of a PUSCH with a high rank and not carrying a UCI;

determining that a priority of a PUSCH with a low rank and not carrying a UCI is higher than a priority of a PUSCH with a high rank and not carrying a UCI;

in response to a first PUSCH and a second PUSCH having a same rank and do not carry a UCI, or in response to UCIs carried by the first PUSCH and the second PUSCH having a same content type and the first PUSCH and the second PUSCH have a same rank, determining priorities of the first PUSCH and the second PUSCH to be inversely related to Modulation and Coding Scheme (MCS) values thereof; or determining that a priority of a configured grant PUSCH is higher than a priority of a scheduled PUSCH.

8. The information sending method according to claim 2, wherein in response to the informations in the target information comprising multiple different SRSs, acquiring the priorities corresponding to the informations in the target information according to the characteristics corresponding to the informations in the target information comprises:

in response to two SRSs being detected to have a same time domain behavior, determining that priorities of the two SRSs are inversely related to numbers of ports corresponding to the two SRSs.

9. A user terminal, comprising:

a determining unit, adapted to, in response to an instruction for sending a target information being detected, determine whether informations in the target information conflict, where the target information comprises N physical channels and M physical signals, and (M+N) ≥2;

an acquiring unit, adapted to acquire priorities corresponding to the informations in the target information, in response to the informations in the target information conflicting;

a processing unit, adapted to, according to the priorities of the informations in the target information, process the target information to get a processed target information, wherein processing the target information comprises: adjusting transmission powers of informations with a lower priority in the target information, or discarding some or all of the informations with the lower priority; and a sending unit, adapted to send the processed target information on a single carrier;

wherein the determining unit is adapted to, in response to the informations in the target information meeting a following condition, determine that the informations in the target information have conflict:

the informations in the target information overlap on at least one symbol, and a sum rank of the informations in the target information is greater than a maximum number of transmission layers supported by the user terminal; or the informations in the target information overlap on at least one symbol, the sum rank of the informations in the target information is greater than the maximum number of transmission layers supported by the user terminal, and the sum power of the informations in the target information is greater than the maximum transmission power of the user terminal.

10. The user terminal according to claim 9, wherein the acquiring unit is adapted to acquire characteristics corresponding to the informations in the target information, where characteristics corresponding to each informations comprises at least one of: a content type corresponding to the information, a time domain type corresponding to the information, a transmission type corresponding to the information and a number of ports corresponding to the information; and according to the characteristics corresponding to the informations in the target information, acquiring the priorities corresponding to the informations in the target information.

11. The user terminal according to claim 10, wherein in response to the informations in the target information comprising a Physical Uplink Shared Channel (PUSCH) and a Physical Uplink Control Channel (PUCCH), the acquiring unit is adapted to acquire the priorities of the informations in the target information in at least one of: determining that a priority of a PUSCH carrying an Uplink Control Information (UCI) which comprises a Hybrid Automatic Repeat Request (HARQ) and/or a Scheduling Request (SR) is higher than a priority of a PUCCH; determining that a priority of a PUSCH carrying a UCI which only comprises a Chanel State Information (CSI) is lower than a priority of a PUCCH carrying a UCI which comprises a HARQ and/or an SR; determining that a priority of a PUSCH carrying a UCI which only comprises a CSI is higher than a priority of a PUCCH carrying a UCI which only comprises a CSI; and determining that a priority of a PUSCH which does not carry a UCI is lower than a priority of a PUCCH.

12. The user terminal according to claim 10, wherein in response to the informations in the target information comprising a PUSCH and a Sounding Reference Signal (SRS), the acquiring unit is adapted to acquire the priorities of the informations in the target information in at least one of: determining that a priority of a PUSCH carrying a UCI which comprises a Hybrid Automatic Repeat Request-Acknowledgement (HARQ-ACK) and/or an SR is higher than a priority of the SRS; determining that a priority of a PUSCH carrying a UCI which only comprises an aperiodic CSI or a RSRP report is higher than the priority of the SRS; determining that a priority of a PUSCH carrying a UCI which only comprises a periodic CSI or a RSRP report is lower than a priority of an aperiodic SRS; determining that a priority of a PUSCH carrying a UCI which only comprises a semi-periodic CSI or a RSRP reports is lower than a priority of an aperiodic SRS; determining that a priority of a PUSCH carrying a UCI which only comprises a CSI or an RSRP report is higher than a priority of a periodic SRS and a priority of a semi-periodic SRS; and determining a priority of a PUSCH which does not carry a UCI is lower than the priority of the SRS.

13. The user terminal according to claim 12, wherein in response to a priority of a PUSCH being higher than a priority of an SRS, the processing unit is adapted to discard SRSs on symbols overlapping in the time domain or reduce transmission powers of the SRSs on the symbols overlapping in the time domain.

14. The user terminal according to claim 12, wherein in response to a priority of a PUSCH being higher than a priority of an SRS, the processing unit is adapted to discard SRS ports corresponding to SRS resources on the symbols overlapping in the time domain or reduce transmission powers of SRS ports corresponding to SRS resources on the symbols overlapping in the time domain.

15. The user terminal according to claim 10, wherein in response to the informations in the target information comprising multiple different PUSCHs, the acquiring unit is adapted to acquire the priorities of the informations in the target information in at least one of: determining that a priority of a PUSCH carrying a UCI which comprises a HARQ and/or an SR and a CSI is higher than a priority of a PUSCH carrying a UCI which only comprises a HARQ and/or an SR; determining that a priority of a PUSCH carrying a UCI which comprises a HARQ and/or an SR is higher than a priority of a PUSCH carrying a UCI which only comprises a CSI; determining that a priority of a PUSCH carrying a UCI which only comprises a CSI is higher than a priority of a PUSCH which does not carry a UCI; determining that a priority of a PUSCH with a low rank and not carrying a UCI is higher than a priority of a PUSCH with a high rank and not carrying a UCI; determining that a priority of a PUSCH with a low rank and not carrying a UCI is higher than a priority of a PUSCH with a high rank and not carrying a UCI; in response to a first PUSCH and a second PUSCH having a same rank and do not carry a UCI, or in response to UCIs carried by the first PUSCH and the second PUSCH having a same content type and the first PUSCH and the second PUSCH have a same rank, determining priorities of the first PUSCH and the second PUSCH to be inversely related to Modulation and Coding Scheme (MCS) values thereof; or determining that a priority of a configured grant PUSCH is higher than a priority of a scheduled PUSCH.

16. The user terminal according to claim 10, wherein in response to the informations in the target information comprising multiple different SRSs, the acquiring unit is adapted to, in response to two SRSs being detected to have a same time domain behavior, determine that priorities of the two SRSs are inversely related to numbers of ports corresponding to the two SRSs.

17. A computer readable storage medium having computer instructions stored therein, wherein the computer readable storage medium is a non-volatile storage medium or a non-transitory storage medium, and once the computer instructions are executed, the method according to claim 1 is performed.

18. A user terminal having a memory and a processor, wherein the memory stores one or more programs, the one or more programs comprising computer instructions, which, when executed by the processor, cause the processor to:
in response to an instruction for sending a target information being detected, determine whether informations in the target information conflict, where the target information comprises N physical channels and M physical signals, and (M+N)≥2;
acquire priorities corresponding to the informations in the target information, in response to the informations in the target information conflicting;
according to the priorities of the informations in the target information, process the target information to get a processed target information, wherein processing the target information comprises: adjusting transmission powers of informations with a lower priority in the target information, or discarding some or all of the informations with the lower priority; and
send the processed target information on a single carrier;
wherein the processor is further caused to, in response to the informations in the target information meeting a following condition, determine that the informations in the target information have conflict:
the informations in the target information overlap on at least one symbol, and a sum rank of the informations in the target information is greater than a maximum number of transmission layers supported by the user terminal; or
the informations in the target information overlap on at least one symbol, the sum rank of the informations in the target information is greater than the maximum number of transmission layers supported by the user terminal, and the sum power of the informations in the target information is greater than the maximum transmission power of the user terminal.

* * * * *